United States Patent [19]
Huskey

[11] Patent Number: 5,725,450
[45] Date of Patent: Mar. 10, 1998

[54] DEVICE FOR PREVENTING DERAILMENT OF A BICYCLE CHAIN

[75] Inventor: Theodore A. Huskey, Portland, Oreg.

[73] Assignee: Joshua Paris, Portland, Oreg.

[21] Appl. No.: 701,046

[22] Filed: Aug. 21, 1996

[51] Int. Cl.$^6$ .................................................. F16H 7/14
[52] U.S. Cl. .................... 474/116; 474/118; 474/134; 74/501.5 R
[58] Field of Search ........................... 474/116, 118, 474/121, 134, 137, 140, 151–153, 159, 160, 162; 74/501.5 R

[56] References Cited

U.S. PATENT DOCUMENTS

| | | | |
|---|---|---|---|
| 1,181,175 | 5/1916 | Shapiro | 474/151 |
| 1,535,114 | 4/1925 | Edmunds | 474/151 |
| 2,204,084 | 6/1940 | Hughes | 474/144 X |
| 2,240,998 | 5/1941 | Montiglio | 474/144 X |
| 3,398,973 | 8/1968 | Shimano et al. | 474/134 X |
| 3,402,942 | 9/1968 | Shimano et al. | 474/134 X |
| 3,416,385 | 12/1968 | Schenk | 474/151 X |
| 3,785,219 | 1/1974 | Anthamatten | 474/134 X |
| 4,099,737 | 7/1978 | Waugh | 474/159 X |
| 4,240,303 | 12/1980 | Mosley | 474/151 X |
| 4,261,214 | 4/1981 | Watanabe et al. | 474/151 X |

*Primary Examiner*—Roger J. Schoeppel
*Attorney, Agent, or Firm*—Robert L. Harrington

[57] ABSTRACT

A device for preventing derailment of a bicycle chain of a bicycle. Upper and lower guide members are positioned strategic to a drive sprocket of the bicycle to guide and maintain the chain in engagement with the drive sprocket regardless of the tension of the chain. The upper and lower guides force the chain to be engaged a longer circumferential distance on the drive sprocket to prevent the chain from jumping off the drive sprocket. Circular guards are mounted on each side of the drive sprocket to protect the drive sprocket and the chain entrained thereon from impact. The spacing of the circular guards provides a channel for receiving the chain as it traverses the drive sprocket.

10 Claims, 6 Drawing Sheets

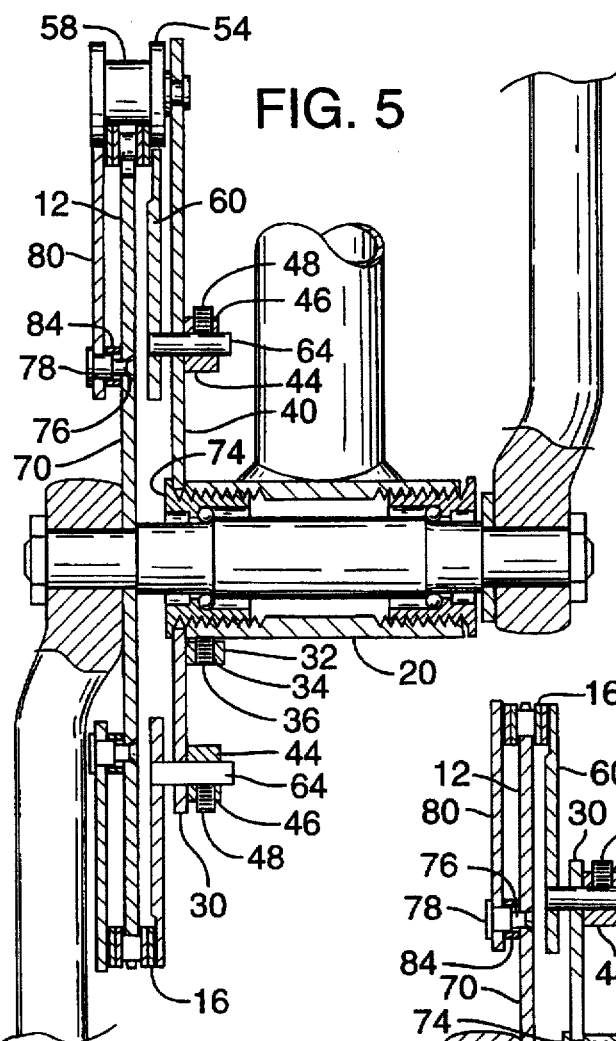
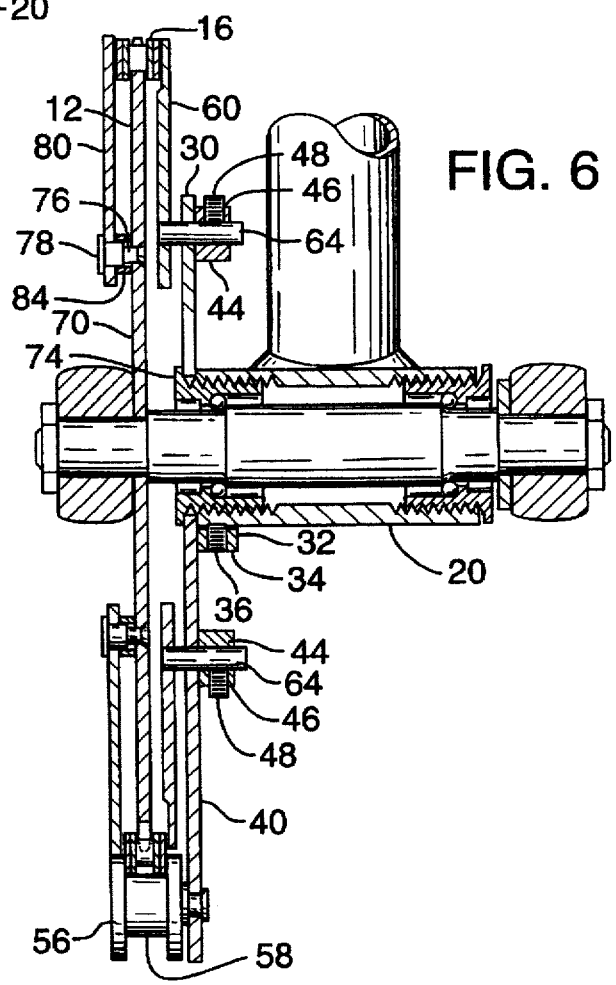

DEVICE FOR PREVENTING DERAILMENT OF A BICYCLE CHAIN

FIELD OF THE INVENTION

This invention relates to bicycles and particularly to bicycle chains and support assemblies therefor whereby the chains are selectively adjusted at one end onto different sized gears and during the process of shifting generate slack in the chain that can cause derailment of the chain off the drive sprocket at the other end.

BACKGROUND OF THE INVENTION

A popular sport is downhill bicycle racing. A racer finds his own trail down a hill and will swerve back and forth and over bumps and through valleys as he attempts to find the shortest and quickest route to the finish line at the bottom of the hill. Selecting the correct gears for the particular terrain being traversed is important. Positioning of the pedals as sharp curves are being maneuvered is also important. It will be appreciated that simultaneous shifting of gears, positioning of pedals and engaging bumps can result in the worst condition for potential derailment of the chain. Whereas chain tighteners are used to minimize the existence of slack in the chain during gear shifting, even the best of tighteners will allow derailment under conditions as explained above.

The present invention is directed to the prevention of chain derailment at the drive or pedal sprocket having particular benefit to the downhill racer but considered applicable to other bicyclists as well.

BRIEF SUMMARY OF THE INVENTION

The invention and its preferred embodiment utilizes an oversized ring on each side of the drive sprocket. The rings are spaced apart so as to form a channel that confines the chain on the drive sprocket without pinching the chain. The positions of entry and exit of the chain into and out of the channel is determined. Upper and lower guide members are provided respectively at the entry and exit positions whereby the chain is directed under the upper guide member, around the sprocket (between the rings) and over the lower guide sprocket as it is directed back to the gear shifting sprockets. Preferably the guide members are low friction, e.g., plastic rollers that are provided with a center groove in which the chain is entrained. Preferably the lower guide member is behind and substantially above the bottom of the ring and is protected by the ring from being hit by rocks and the like. In any event, the combination of the rings, the guides and the sprocket teeth encircle the chain at the entry and exit positions to thereby control the chain length from the point of entry to the point of exit and prevents loosening of the chain between these positions such as would cause derailment due to slack generated during shifting of the gears.

The above brief description of the invention is distinguished from known prior art devices in several respects. One version of prior art devices incudes upper and lower chain guides through which the chain is directed and onto the sprocket. These guides do not incorporate confining rims and they produce undesired frictional drag. A second version provides upper and lower rollers with deep grooves with the periphery of the drive gear as well as the chain entrained thereon projected into the groove. Again this version does not incorporate the rims and does not adequately avoid derailment. It is believed that rims also are provided without guides but primarily for protection against rocks impacting the drive gear. The unique combination of the rims and guide members as contemplated by the inventor is important to not only avoid derailment but to also protect the guide members from rock damage.

Other advantages and features of the invention will become apparent on reference to the detailed description having reference to the appended drawings.

BRIEF DESCRIPTION OF THE DRAWINGS

FIG. 5 is a view as viewed on view lines 5—5 of FIG. 1A illustrating the device for preventing derailment of a bicycle chain as applied to the bicycle of FIG. 1A;

FIG. 6 is a view as viewed on view lines 6—6 of FIG. 1A illustrating the device for preventing derailment of a bicycle chain as applied to the bicycle of FIG. 1A;

DESCRIPTION OF THE PREFERRED EMBODIMENT

Figure 1A:
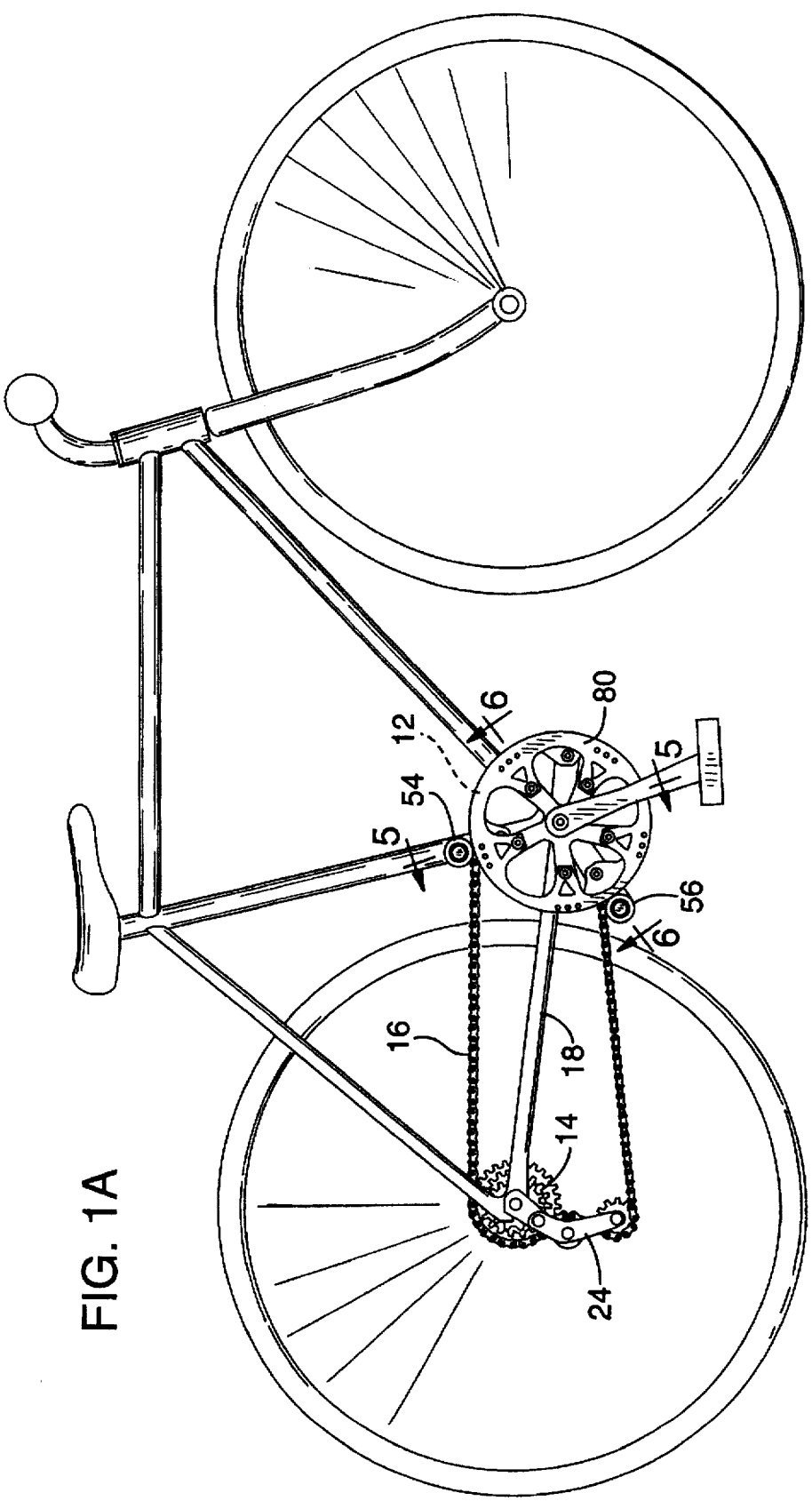
FIG. 1A and 1B are views of bicycles incorporating the device for preventing derailment of a bicycle chain of the present invention.
Figure 1B:
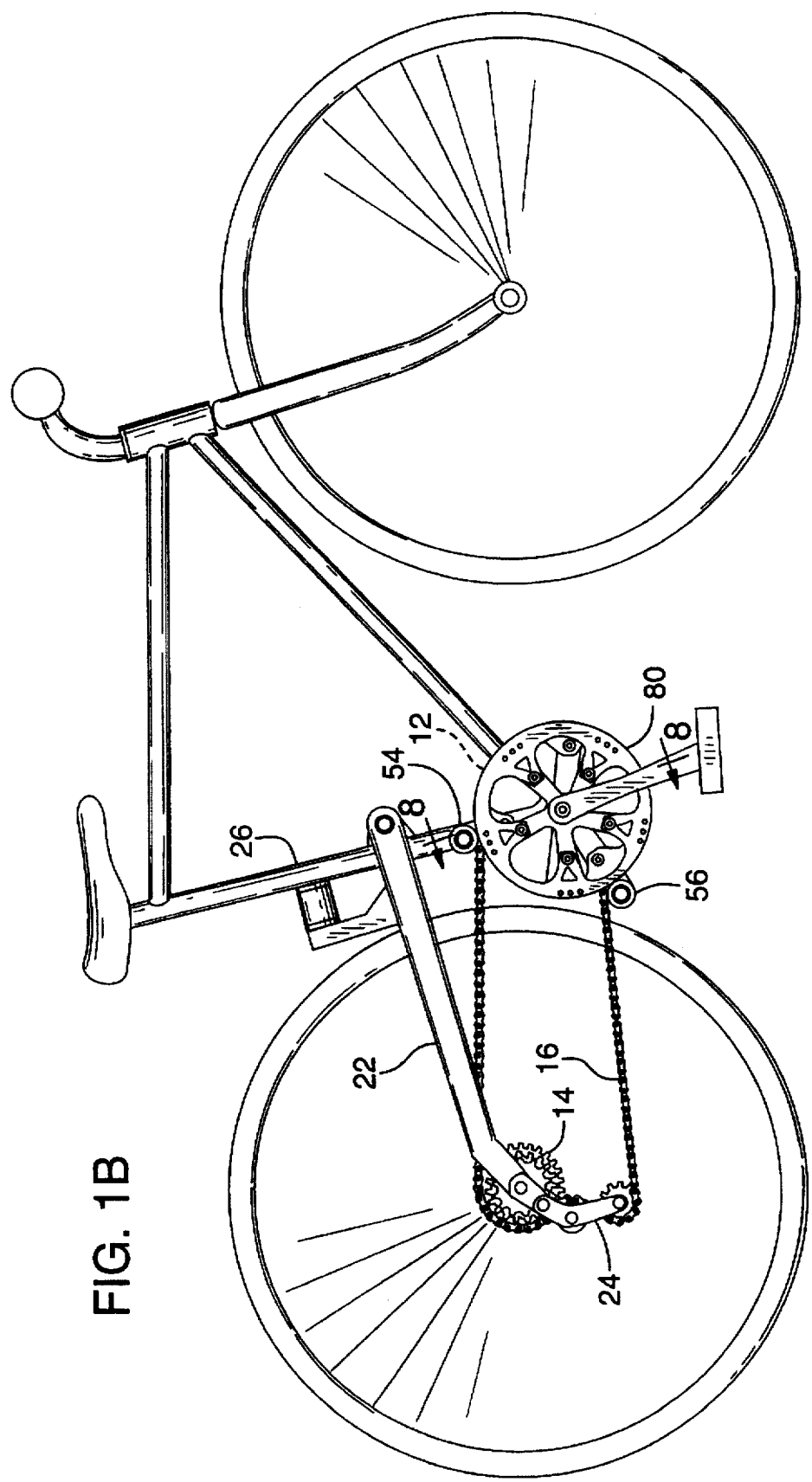

Refer now to FIGS. 1A and 1B of the drawings which illustrate bicycles that are typically utilized in downhill racing. The bicycles of FIGS. 1A and 1B incorporate a device for preventing derailment of the bicycle chain of the present invention. The bicycles have a single drive sprocket 12 that is coupled to a stepped driven sprocket 14 by an endless chain 16. A known shift mechanism 24 is provided that will shift the chain 16 onto any one of the steps of the driven sprocket 14 to provide different gear ratios in a conventional manner. The bicycle of FIG. 1A has a fixed chain stay 18 that extends from the crank arm housing 20 (best seen in FIG. 7). The bicycle of FIG. 1B differs from the bicycle in FIG. 1A in that the chain stay 22 is mounted to a support strut 26 above the crank arm housing 20. The device for preventing derailment of the chain of the present invention is arranged to accommodate both types of bicycles illustrated in FIGS. 1A and 1B.

The bicycles illustrated in FIGS. 1A and 1B each have a chain tensioning device that is part of the shift mechanism 24 that permits movement of the chain 16 onto the individual steps of the driven sprocket 14. The chain tensioning device is arranged to provide adequate slack when shifting a chain from a smaller step to a larger step on the driven sprocket 14 or conversely from a larger step to a smaller step. The chain tensioning device 24 is by design arranged to provide adequate slack to permit the smooth transition of shifting the chain 16 onto any one of the steps of the driven sprocket 14. The chain tensioning device 24 therefore in many situations will allow adequate slack to allow the chain 16 to jump or exit from the drive sprocket 12. This is particularly true when a rider will have to back pedal the pedals of the bicycle for rapid shifting or to position a pedal for a tight turn. The device for preventing derailment of a bicycle chain of the present invention prevents the chain 16 from leaving the drive sprocket 12 under all conditions.

Figure 2:
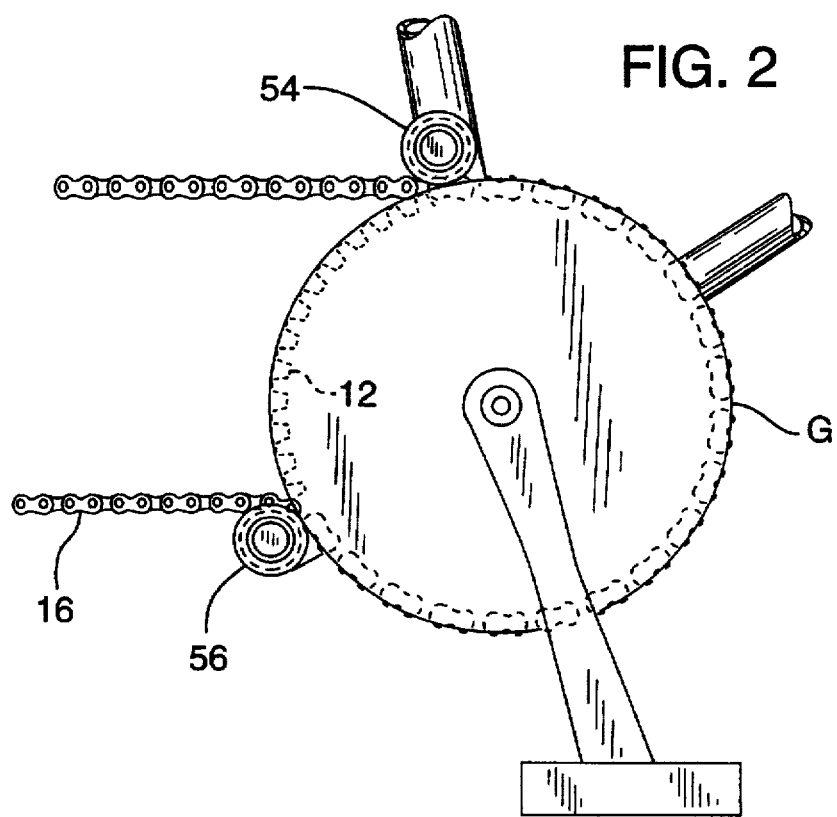
FIG. 2 is a general view of the device for preventing derailment of a bicycle chain.

Refer now to FIG. 2 of the drawings which illustrates the device for preventing derailment of a bicycle chain as applied to the bicycles of FIGS. 1A and 1B. The drive sprocket 12 is protected by circular guards (rims or rings) positioned on each side of the drive sprocket 12 and being designated as G in FIG. 2. The guards G are preferably of a larger diameter than the drive sprocket 12 to protect the drive sprocket 12 and the chain 16 entrained thereon. The guards G are further explained and illustrated for each of the bicycles in subsequent figures. An upper chain guide 54 and a lower chain guide 56 are mounted strategic to the drive sprocket 12 and the guards G. The guides 54, 56 guide the chain 16 onto and off of the drive sprocket 12 to ensure exacting alignment of the chain 16 with the sprocket 12. The guides 54, 56 further force the chain 16 to be in engagement with the sprocket 12 for a greater circumferential distance to ensure positive engagement of the chain 16 with the drive sprocket 12. The arrangement of the guides 54, 56 ensure the proper alignment and engagement of the chain 16 with the drive sprocket 12 regardless of the tension applied to the chain 16. The drive sprocket 12, guards G and the guides 54, 56 in combination prevent or restrict any wave action or flopping of the chain 16 when in the loosened condition to maintain the chain 16 in positive engagement with the drive sprocket 12. The guides 54, 56 in particular prevent the chain 16 from derailing from the drive sprocket 12. The lower guide 56 as seen in FIGS. 1A, 1B and 2 is positioned rearward of the guards G and above the lower surface of the guards G to protect the guide 56 from impacts from objects such as rocks, limbs, chuck holes and the like as the bicycle travels in a forward direction.

Figure 3:
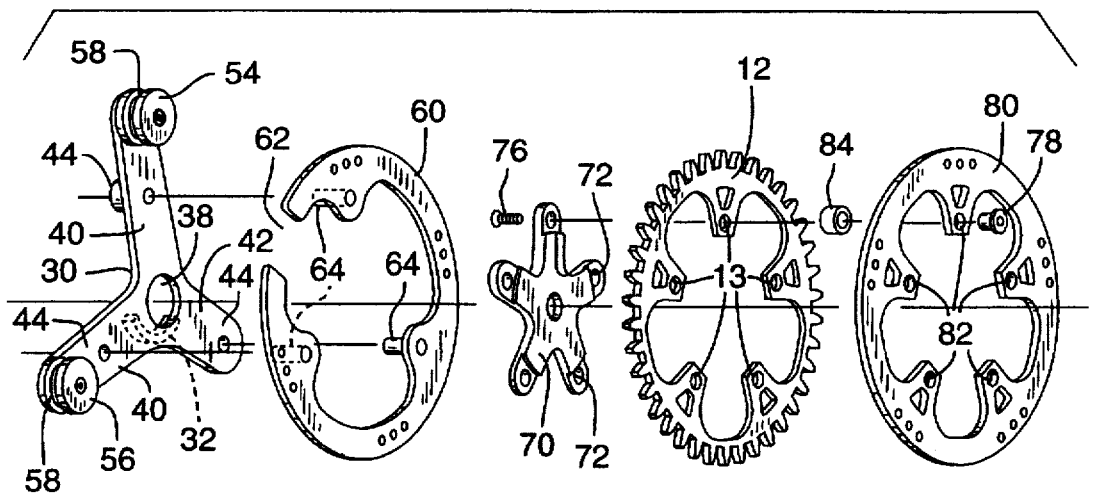
FIG. 3 is a view of the device for preventing derailment of a bicycle chain as applied to the bicycle of FIG. 1A.

FIG. 3 illustrates in exploded view a device for preventing derailment of the bicycle chain for the bicycle of FIG. 1A which has a fixed chain stay 18 extending from the crank arm housing 20. A supporting member 30 which has a bore 38 is mountable to the crank arm housing 20. The support 30 has a flange 32 that is configured to surround a portion of the crank arm housing 20 and the flange 32 has threaded bores 34 to receive set screws 36 (see FIGS. 5 and 6). The support member 30 has extending arms 40, 42 to which an inner circular guard 60 is adjustably mountable. Each of the arms 40, 42 has bushings 44 fixed mounted and extending from the arms 40, 42 on the same side as the flange 32. The bushings 44 have bored and tapped holes 46 that will receive set screws 48 (best seen in FIGS. 5 and 6). The arms 40 additionally support chain guide members 54, 56. The guide members 54, 56 in this embodiment are rollers that are rotatably mounted on the arms 40 on low friction bearings in a conventional manner. The guide members 54, 56 each have a central channel like groove 58 to receive and guide the chain 16 onto the drive sprocket 12.

The inner guard 60 is circular and has a cut out or cut away portion 62 so that the inner guard 60 does not interfere with the fixed chain stay 18. The inner guard 60 has shafts 64 fixedly mounted and extending from the guard 60. The shafts 64 are alignable and insertable into the bushings 44 provided on the arms 40, 42 of the support 30.

A drive spider 70 which is part of the crank arm assembly and a drive sprocket 12 which is removably mounted to the spider 70 is also illustrated. The drive sprocket 12 has bores 13 that are alignable with the bores 72 of the spider 70.

An outer circular guide guard 80 is removably mountable to the drive sprocket 12. The guard 80 has bores 82 alignable with bores 72 in the spider 70. Tubular spacers 84 are provided to position the guard 80 at a strategic distance from drive sprocket 12 mounted to the spider 70.

Refer now to FIGS. 5 and 6 which illustrate the derailment device of FIG. 3 mounted to the bicycle of FIG. 1. As shown the support member 30 is mounted to the crank arm housing 20 and is retained by a threaded cup 74. The flange 32 of the support 30 surrounds the housing 20 and the set screws 36 are advanced to engage the housing 20 to maintain the support 30 in an adjusted radial position relative to the housing 20. The inner circular guard 60 is adjustably mounted to the support 30. The shafts 64 of guard 60 are received in the bushings 44. The bushings 44 have bored and tapped holes 46 that receive set screws 48. The inner circular guard 60 is adjusted relative to the support member 30 to position the inner guard 60 at the proper distance from the drive sprocket 12. The set screws 48 are tightened to secure the guard 60 in the adjusted position.

The spider 70 is mounted to the crank arm assembly in a conventional manner. The drive sprocket 12 and the outer circular guard 80 are mounted to the spider 70. The spacers 84 fit between the drive sprocket 12 and the outer guard 80 to properly position the guard 80 at the desired distance from the sprocket 12. The spacers 84 are aligned with the bores 82, 13 and 72. The drive sprocket 12 and the guard 80 are secured to the spider 70 by conventional fasteners such as bolts 76 and nuts 78.

Figure 7:
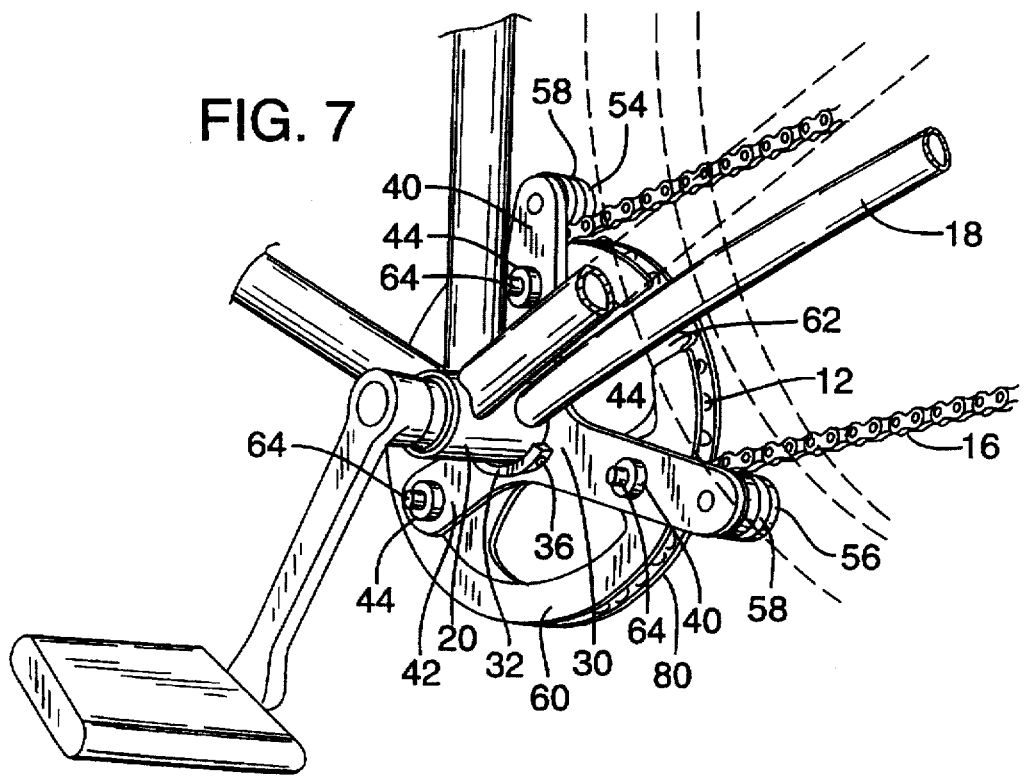
FIG. 7 is another view of the device for preventing derailment of a bicycle chain as applied to the bicycle of FIG. 1A.

FIG. 7 further illustrates the device for preventing derailment of the bicycle chain 16 mounted on the bicycle of FIG. 1A. As shown the support 30 is fixedly mounted to the crank arm housing 20. The inner guard 60 is mounted to the support 30 in an adjusted position relative to the drive sprocket 12. The inner guard 60 is thus mounted in a non-rotatable manner. The upper guide 54 and the lower guide 56 receive the drive chain 16 and are positioned at a strategic position to guide the chain 16 onto and off of the drive sprocket 12. The positioning of the guides 54, 56 ensures that the chain 16 will remain in engagement with the drive sprocket 12. The outer guard 80 is mounted to the drive sprocket 12 (and spider 70) to rotate with the drive sprocket 12. The guards 60, 80 in combination provide guards for protecting the drive sprocket 12 and the chain 16. The spacing between the guards 60 and 80 define a channel in which the chain 16 will be received as the chain traverses the drive sprocket 12. It will be noted that guides 54 and 56 engage outer guard 80 and not inner guard 60. Guides 54 and 56 are rotatably driven with rotation of the drive sprocket and thus the contact between the chain 16 and the guides 54 and 56 is a rolling contact thereby avoiding any frictional drag on chain 16.

Figure 4:
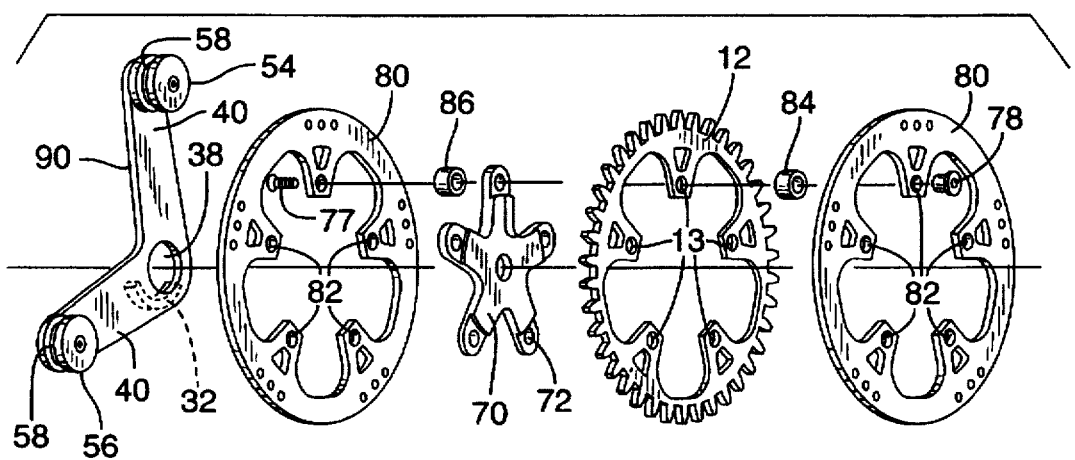
FIG. 4 is a view of the device for preventing derailment of a bicycle chain as applied to the bicycle of FIG. 1B.

FIG. 4 illustrates in exploded view a device for preventing derailment of a bicycle chain for the bicycle illustrated in FIG. 1B. As previously mentioned, the bicycle of FIG. 1B has an elevated chain stay 22 extending from the support structure 26 which is elevated above the rotational path of the drive sprocket 12. A support member 90 which has a bore 38 is mountable on the crank arm housing 20. The support 90 has a flange 32 that is configured to surround a portion of the crank arm housing 20 and the flange 32 has threaded bores 34 to receive set screws 36 (see FIG. 8). The support 90 has arms 40 on which an upper guide 54 and a lower guide 56 are rotatably mounted on low friction bearings. The guides 54, 56 each have a central groove 58. The device for the bicycle of 1B has two circular guards 80 that are mountable to the drive sprocket 12 (and the spider 70). Tubular bored spacers 84, 86 are provided to space the guards 80 from the drive sprocket 12 (and spider 70). The guards 80, drive sprocket 12 and spider 70 are secured together by known fasteners such as bolts 77 and nuts 78. The guards 80 are fixedly attached to the drive sprocket 12 and rotate with the drive sprocket.

Figure 8:
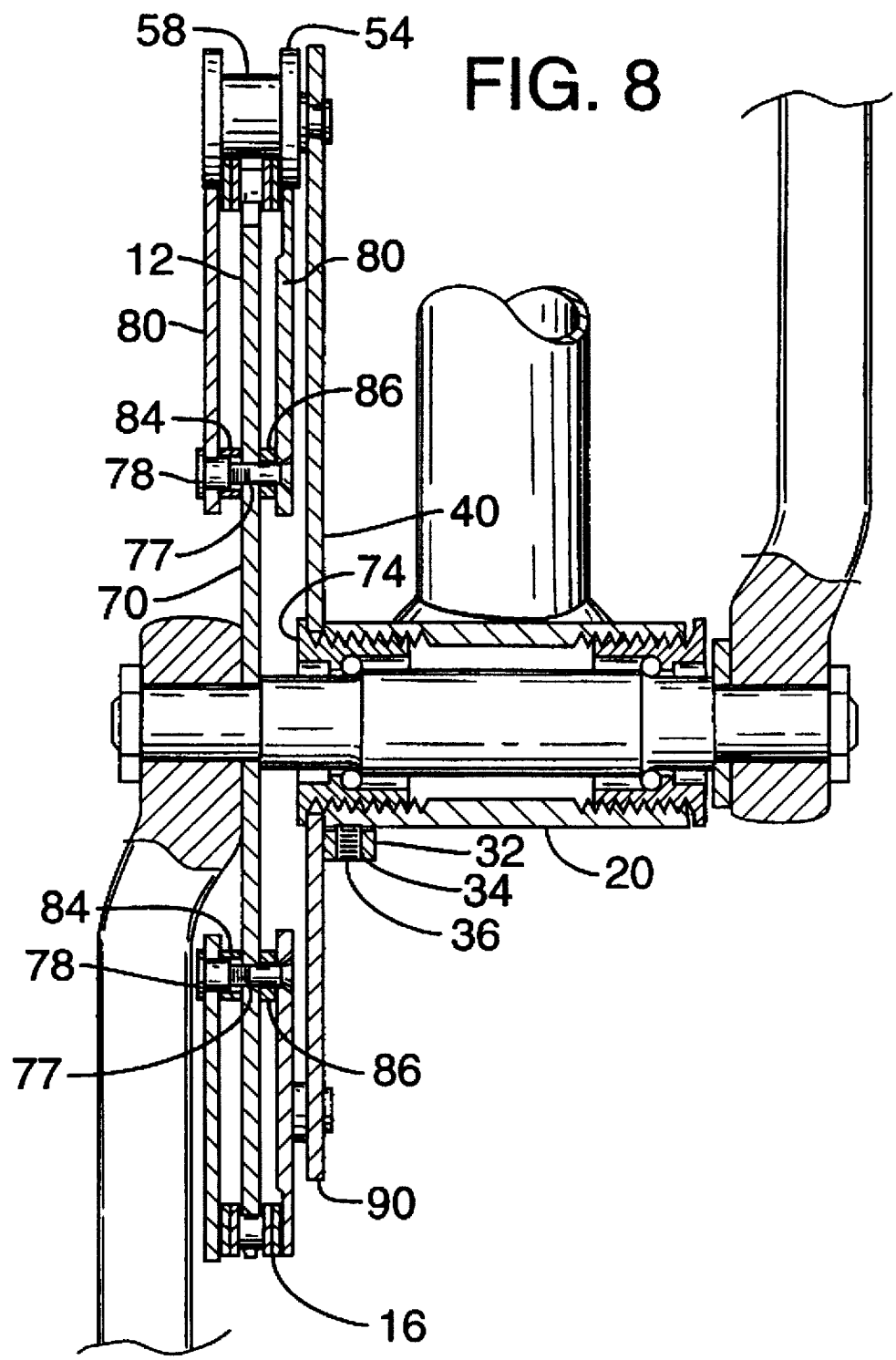
FIG. 8 is a view as viewed on view lines 8—8 of FIG. 1B illustrating the device for preventing derailment of a bicycle chain as plied to the bicycle of FIG. 1B.

FIG. 8 illustrates the mounting of the device illustrated in FIG. 4 on the bicycle of FIG. 2. The support 90 is mounted to the crank arm housing 20 and is retained by a threaded cup 74. The set screws 36 are advanced against the housing 20 to retain the support 90 in an adjusted radial position. The spider 70 is mounted to the crank arm assembly of the bicycle in a conventional manner. The drive sprocket 12 and the guards 80 are fixedly mounted to the spider 70 utilizing the spacers 84, 86 and the bolts 77 and nuts 78. The spacers 84, 86 are of a dimension to space the guards 80 at a distance from the drive sprocket 12. The spacing between the guards 80 define a channel in which the chain 16 will be received as the chain traverses the drive sprocket 12.

Those skilled in the art will recognize that modifications and variations may be made without departing from the true spirit and scope of the invention. For example, although the low friction roller guides are desirable, other forms of guide surfaces may be suitable. The invention is therefore not to be limited to the embodiments described and illustrated but is to be determined from the appended claims.

I claim:

1. A bicycle comprising:

a drive sprocket having a configured periphery forming sprocket teeth, a driven sprocket associated with a bicycle wheel and an endless chain entrained around the sprockets and interconnecting the sprockets whereby powered rotation of the drive sprocket produces rotation of the driven sprocket and the bicycle wheel associated therewith;

said chain engaging and disengaging from the drive sprocket at entry and exit positions, a rim provided adjacent each side of the drive sprocket, and upper and lower guide rollers positioned at the entry and exit positions, and said sprocket, rims and guide rollers cooperatively providing an encircling guide way through which the chain is guided onto the sprocket for restricting any wave effect generated by a loosened chain condition from traveling around the drive sprocket such as to derail the chain from the sprocket.

2. A bicycle as defined in claim 1 wherein the guide rollers include center and side segments, the center segment contacting the chain and the side segments in a substantially abutting relation with the rims to form the encircling guide way.

3. A bicycle as defined in claim 2 wherein the center segment of the rollers has a smaller diameter than the side segments whereby wish the center segment engaging the chain the side segments overlap the chain sides.

4. A bicycle as defined in claim 2 wherein at least one of the rims is connected to the sprocket and rotates with the sprocket, said guide rollers in engagement with said one of the rims and rotatively driven thereby.

5. A bicycle as defined in claim 2 wherein one of said rims is non-rotatable and is near and not in engaging abutment with the guide rollers.

6. A bicycle as defined in claim 2 wherein both of the rims are connected to and rotate with said drive sprocket.

7. A bicycle as defined in claim 1 wherein the lower guide roller is significantly rearward of the rim bottom to protect the guide member from engagement by rocks.

8. A bicycle comprising:

a drive sprocket having a configured periphery forming sprocket teeth, a driven sprocket associated with a bicycle wheel and an endless chain entrained around the sprockets and interconnecting the sprockets whereby powered rotation of the drive sprocket produces rotation of the driven sprocket and the bicycle wheel associated therewith;

said endless chain having a drive sprocket entry position and a drive sprocket exit position as determined where a side of the chain engages and disengages the drive sprocket, a guide roller engaging the opposite side of the chain at the position where the chain engages the drive sprocket at the entry position, and a confining wall portion mounted at each side of the drive sprocket at said entry position, said drive sprocket teeth, said confining wall portion and said roller at said entry position cooperatively forming a substantially encircling guide way for the chain whereby the chain is guided between the wall portion, under the roller and onto the sprocket teeth regardless of chain tension and to thereby avoid chain derailment.

9. A bicycle as defined in claim 8 wherein a guide roller and confining wall portions are also provided at the exit position to define an encircling guide way for the chain at said exit position.

10. A bicycle as defined in claim 9 wherein the engagement of the chain by the rollers establishes the point of entry and exit of the chain onto the sprocket.

\* \* \* \* \*

UNITED STATES PATENT AND TRADEMARK OFFICE
CERTIFICATE OF CORRECTION

PATENT NO. : 5,725,450
DATED : March 10, 1998
INVENTOR(S) : Huskey

It is certified that error appears in the above-identified patent and that said Letters Patent is hereby corrected as shown below:

Col. 6, line 3, replace "wish" with --with--.

Signed and Sealed this

Fifth Day of May, 1998

Attest:

BRUCE LEHMAN

Attesting Officer

Commissioner of Patents and Trademarks